US005698149A

United States Patent [19]

Hinzmann et al.

[11] Patent Number: 5,698,149

[45] Date of Patent: Dec. 16, 1997

[54] PHASED SPLIT DIE

[75] Inventors: Gerd Hinzmann; Mark Haiko; Frank Ma; Allan Wilson; Keith Buckley-Golder; Robert Round, all of Mississauga, Canada

[73] Assignee: Stackpole Limited, Mississauga, Canada

[21] Appl. No.: 495,476

[22] PCT Filed: Nov. 24, 1993

[86] PCT No.: PCT/CA93/00506

§ 371 Date: Sep. 11, 1995

§ 102(e) Date: Sep. 11, 1995

[87] PCT Pub. No.: WO95/14568

PCT Pub. Date: Jun. 1, 1995

[51] Int. Cl.$^6$ .............................. B29C 43/42; B30B 11/14

[52] U.S. Cl. .......................... 264/120; 264/294; 264/318; 264/325; 425/353; 425/354; 425/356; 425/DIG. 58

[58] Field of Search .................................... 264/109, 120, 264/294, 318, 325; 425/352, 353, 354, 355, 356, DIG. 58

[56] References Cited

U.S. PATENT DOCUMENTS 2,561,735 7/1951 Haller .
3,020,589 2/1962 Maritano .
3,394,432 7/1968 Laurent .
3,694,127 9/1972 Takahashi et al. ...................... 425/325
3,891,367 6/1975 Signora .
3,909,167 9/1975 Signora .................................. 425/352
4,008,021 2/1977 Fedrigo et al. .
4,043,385 8/1977 Petrenchik ..................... 425/DIG. 58
4,047,864 9/1977 DeSantis .
4,053,267 10/1977 DeSantis .
4,061,452 12/1977 DeSantis .
4,061,453 12/1977 DeSantis .
4,087,221 5/1978 Munson et al. .
4,153,399 5/1979 DeSantis .
4,270,890 6/1981 Ottl .
4,401,614 8/1983 DeSantis .
4,482,307 11/1984 Schaidl et al. .
4,573,895 3/1986 DeSantis et al. ....................... 425/352
4,666,389 5/1987 Relis et al. .
4,853,180 8/1989 Howard .
4,923,382 5/1990 Klein .
5,024,811 6/1991 Hinzmann et al. .
5,043,111 8/1991 Hinzmann et al. .
5,043,123 8/1991 Gormanns et al. .
5,049,054 9/1991 Schaidl et al. .
5,156,854 10/1992 Yamada .
5,238,375 8/1993 Hirai ....................................... 425/352
5,259,744 11/1993 Take .
5,326,242 7/1994 Katagiri et al. .
5,366,363 11/1994 Good et al. .
5,378,416 1/1995 Kishi et al. ............................ 425/352
5,401,153 3/1995 Katagiri et al. .
5,478,225 12/1995 Takeuchi et al. .
5,498,147 3/1996 Katagiri et al. .

OTHER PUBLICATIONS

"Sintered Helical Gears in One Operation" –Date, Author and Publication unknown.

SAE Technical Paper Series 960278, Nagata and Sugimoto, Feb. 26 –29, 1996 "The Development of P/M Complicated Shape Helical Gears".

*Primary Examiner*—David A. Simmons
*Assistant Examiner*—Kenneth M. Jones
*Attorney, Agent, or Firm*—John R.S. Orange

[57] ABSTRACT

This invention relates to a device to compact parts with an undercut out of powder metal, including a pair of dies linearly moveable relative to one another and then phased, and an associated linearly displaceable pair of punches to produce said parts with said undercut.

40 Claims, 5 Drawing Sheets

PHASED SPLIT DIE

FIELD OF INVENTION

This invention relates to dies and particularly split dies for producing compacted parts out of powder material having an undercut, and more specifically relates to a device to compact parts out of powder material which includes a pair of dies linearly moveable relative to one another and then phased, and an associated linearly displaceable pair of punches for producing parts which are phased or have an undercut.

BACKGROUND OF THE INVENTION

Devices to compact parts out of powder material for sintering are well known to those persons skilled in the art. In some cases, the compacted part has an undercut which prevents removal of the part or blank from the dies by linear or axial displacement.

Tool sets with split dies are known in powder material compaction to press parts into shapes that have an undercut in the compacting direction.

For example, U.S. Pat. No. 3,773,446 teaches a device for moulding parts to be sintered by compressing powdered material held between a fixed die and moveable die. A pair of punches extending through the dies compresses the powder material. A pressure plate operated by the punch extending through the moveable die engages the moveable die and is also locked to the fixed die during the compression to produce a part having an undercut.

U.S. Pat. No. 3,752,622 teaches a device for moulding blanks with undercut parts to be sintered by compaction of powder material.

The prior art teaches that both parts of the die are tied together while a feed box moves across the top of the dies for filling the cavity with powdered material. After compaction the upper part of the die moves away together with the top punch to eject the part.

One of the disadvantages of the known systems as referred to above relates to the fact that the upper part of the die has to be tied mechanically to the lower part of the die and the upper punch in an alternating mode, thus making a complicated tool rig necessary.

Moreover, gearsets and camsets, for example, are characterized by two levels of the same shape but phased to each other to comprise an undercut in the compacting direction. Such parts may be manufactured in by known methods as referred to above with the disadvantages noted therein.

Another disadvantage of the prior art is that the undercut can only be indirectly filled thereby creating a section of lower density in the compacted part.

It is therefore an object of this invention to provide a device that is simpler to construct and more efficient to operate than heretofore known by the prior art.

It is another object of this invention to provide a tool system with a split die where both parts of the die remain tied to one part of the rig during the entire cycle.

It is a further object of this invention to provide a device and method to produce compact phased parts such as gears, cams and the like with less complicated tooling and more efficient fill of the undercut than presently available.

In a first aspect of the invention there is provided a tool set for a powder molding machine having a pair of die sets each having a die and a punch moveable relative thereto to define respective chambers, the die sets co-operable to place the chambers in communication and thereby to define a mold cavity, the punches being movable relative to one another in a direction parallel to a common axis to reduce the volume of the mold cavity and to compress powder therein, the dies being movable relative to one another in a plane normal to the common axis, independently of movement along the common axis, to displace the chambers relative to one another and to define a phased component in the mold cavity, and the dies being separable in the direction of the common axis to permit a molded component to be removed therefrom.

In one aspect of the invention the dies are movable in linear translation, one relative to the other, in the plane normal to said common axis. In another aspect of the invention the dies are movable in rotation, one relative to the other, in said plane normal to the common axis.

In another aspect of the invention, the tool set is additionally movable to filling, transfer, lateral displacement and withdrawal positions and each said punch is at least partially engaged with each of said dies of said respective die sets in each of said filling, transfer, lateral displacement and withdrawal positions.

In still another aspect of the invention there is provided a tool set for mounting in a powder compacting press, the press having an axis of reciprocation, the tool set comprising a first die and punch set for mounting with the press, including a first die and a first punch movable within the first die to form a first chamber for receiving a charge of powder; a second die and punch set for mounting with the press, the second die and punch set co-operable with the first die and punch set and including a second die and a second punch movable within the second die for forming a second chamber therewithin; the second die movable parallel to the axis relative to the first die to meet the first die at an interface; and with the first and second dies in contact at the interface and with the first and second chambers in communication to define a closed mold cavity for containing the charge of powder, the second die being movable relative to the first die to a transversely displaced position.

Another aspect of the invention encompasses a press assembly for producing compacted powder metal parts, that press assembly comprising a powder press having an axis of reciprocation and a tool set for mounting in that press, that tool set including a first die set and a second die set, the first die set having a first die and a first punch movable in sliding engagement with, and relative to, the first die for forming a first chamber, the second die set having a second die and a second punch movable in sliding engagement with, and relative to, the second die for forming a second chamber, the die sets co-operable to place the chambers in communication and thereby to define a mold cavity, the punches being movable relative to one another in a direction parallel to the axis to reduce the volume of the mold cavity and to compress powder therein, the dies being movable relative to one another in a plane normal to the axis independently of movement along the axis to displace the chambers relative to one another and to define a phased component in the mold cavity, and the dies being separable in the direction of the common axis to permit a molded component to be removed therefrom.

One aspect of the invention is a method for making compacted powder parts with a tool set for mounting in a press having an axis of reciprocation, the tool set including a first die and punch set mountable in the press and a co-operating second die and punch set mountable in the press, the first die and punch set including a first die and a first punch movable therewithin to form a first chamber, the second die and punch set including a second die and a second punch movable therewithin to form a second chamber, that method comprising the sequential steps of a) establishing the tool set in a position in which the first chamber and the second chamber are in communication to form a closed mold cavity, with a charge of powder captured therein; b) displacing the second die relative to the first die while maintaining the first and second chambers in closed communication; c) compacting the powder to form a compacted powder part; and d) ejecting the compacted powder part from the tool set in one embodiment of the invention the step of displacing includes linearly translating the second die relative to the first die. In another embodiment of the invention the step of displacing includes rotating the second die relative to the first die about an axis parallel to the axis of reciprocation. In yet another embodiment of this aspect of the invention step (a) includes a(i) filling the first chamber with the charge of powder; and a(ii) transferring a portion of the charge of powder from the first chamber to the second chamber.

DRAWINGS OF THE INVENTION

These and other objects and features of the invention shall now be described in relation to the following drawings.

FIG. **4*a*** shows a tool set in a position for receiving a charge of powder.

Figure 4B:
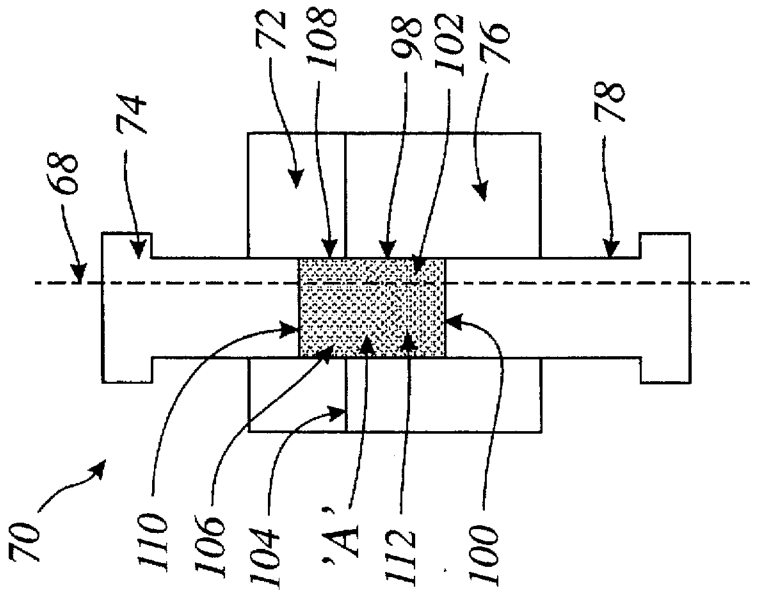
Figure 4A:
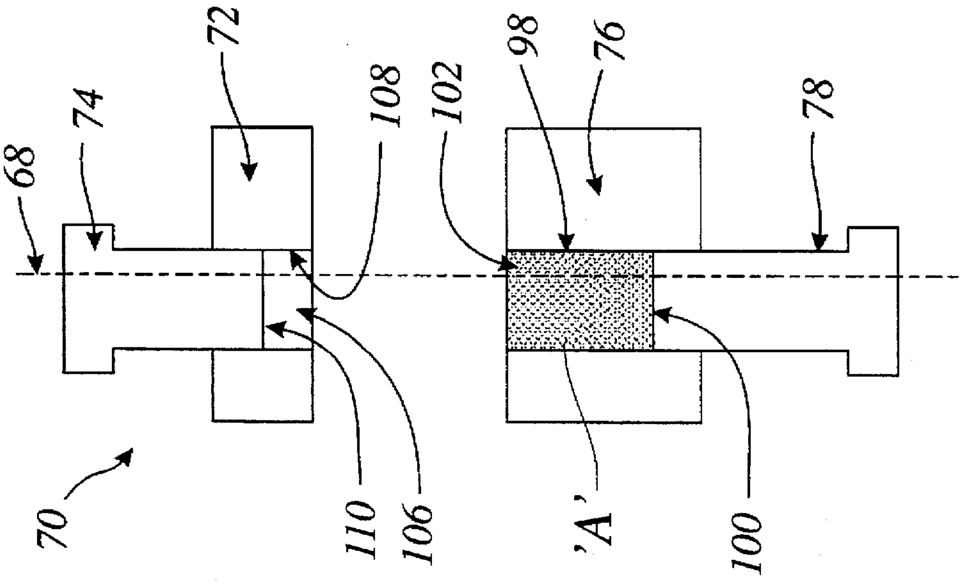
Figure 4E:
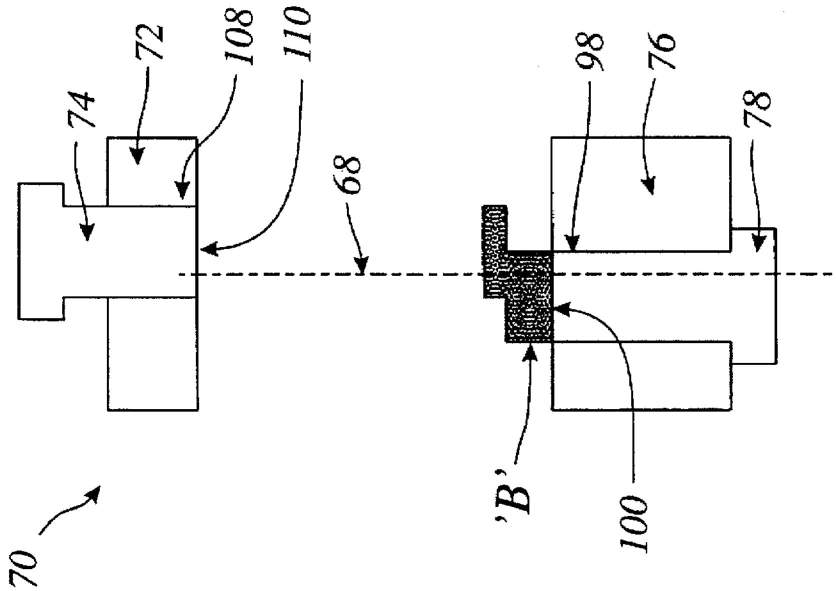

FIG. **4*b* shows the tool set of FIG. 4*a*** in a closed, transfer position.

FIG. **4*c* shows the tool set of FIG. 4*a*** in a phased position.

FIG. **4*d* shows the tools set of FIG. 4*a*** in a compacted position

FIG. **4*e* shows the tool set of FIG. 4*a*** in a withdrawal position for ejecting a compact.

Figure 5:
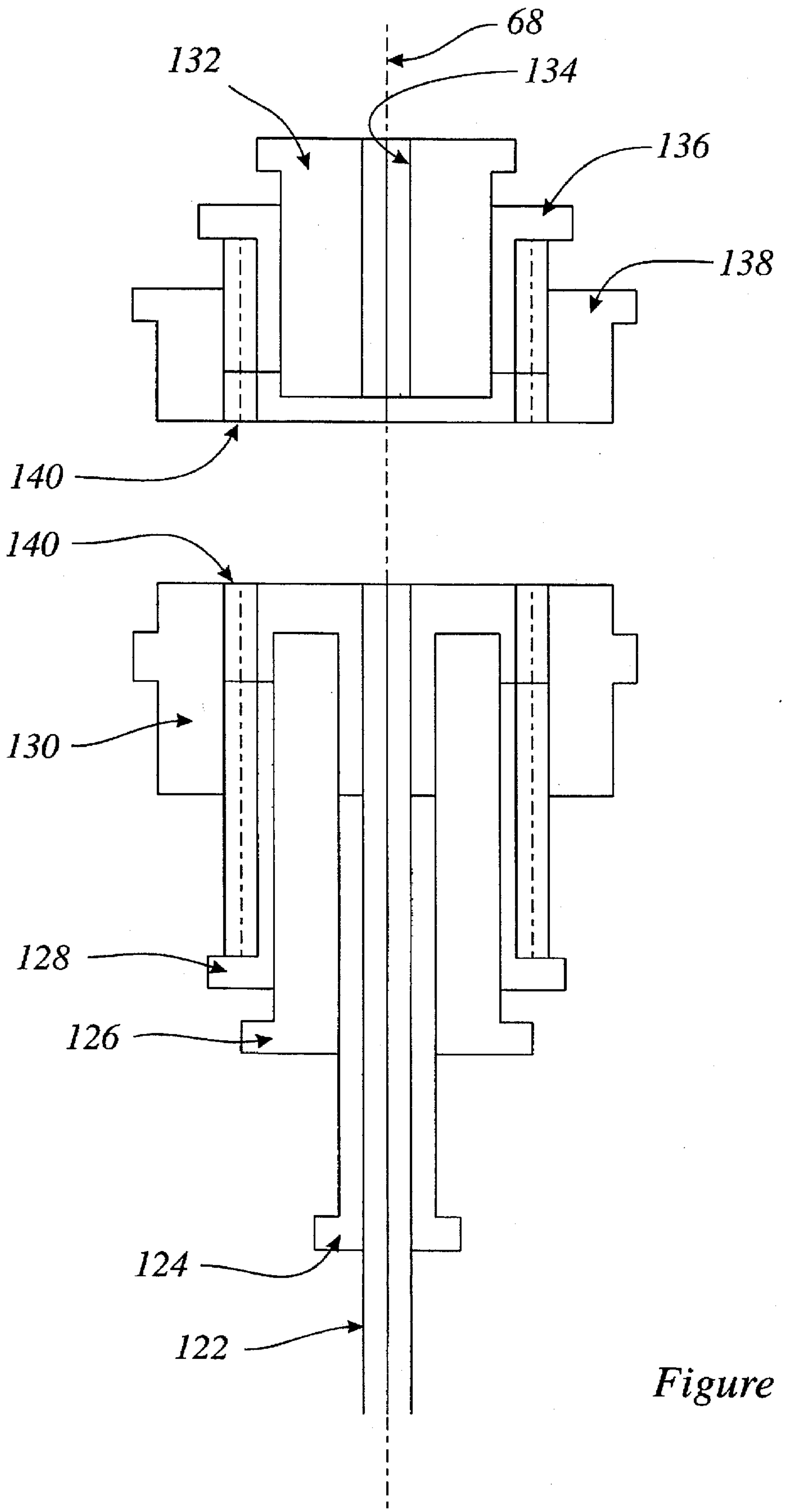

FIG. 5 is a schematic view of a second embodiment of tool set employing multiple punches.

Figure 6:
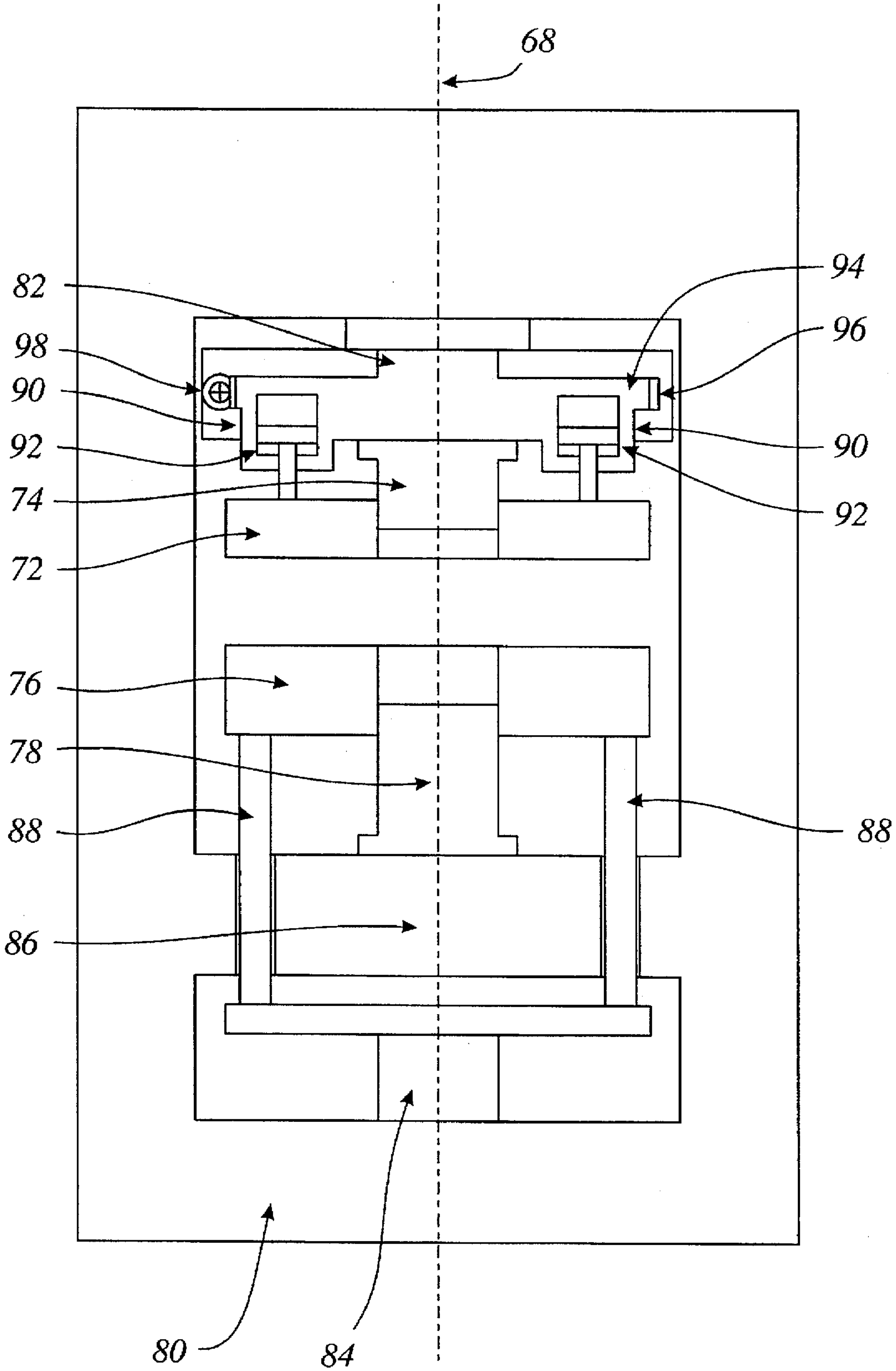

FIG. 6 is an elevation of a press in which the tool set of FIGS. **4*a* through 4*e*** has been mounted.

DESCRIPTION OF THE INVENTION

Like parts are given like numbers throughout the detailed description of the preferred embodiments of the invention which follows.

Figure 2:
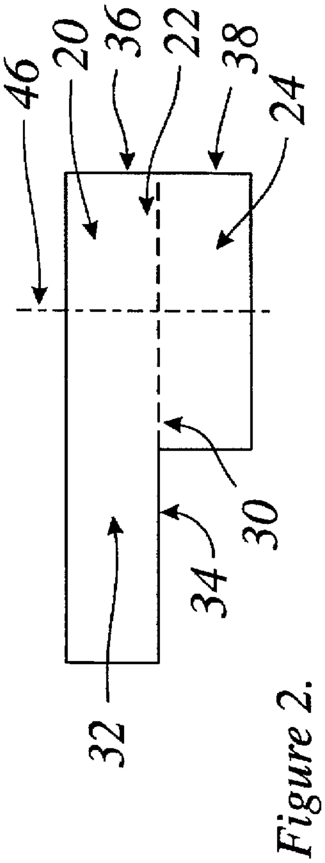
FIG. 2 is an elevation of the phased part of FIG. 1 in the direction of arrows '2—2'.
Figure 1:
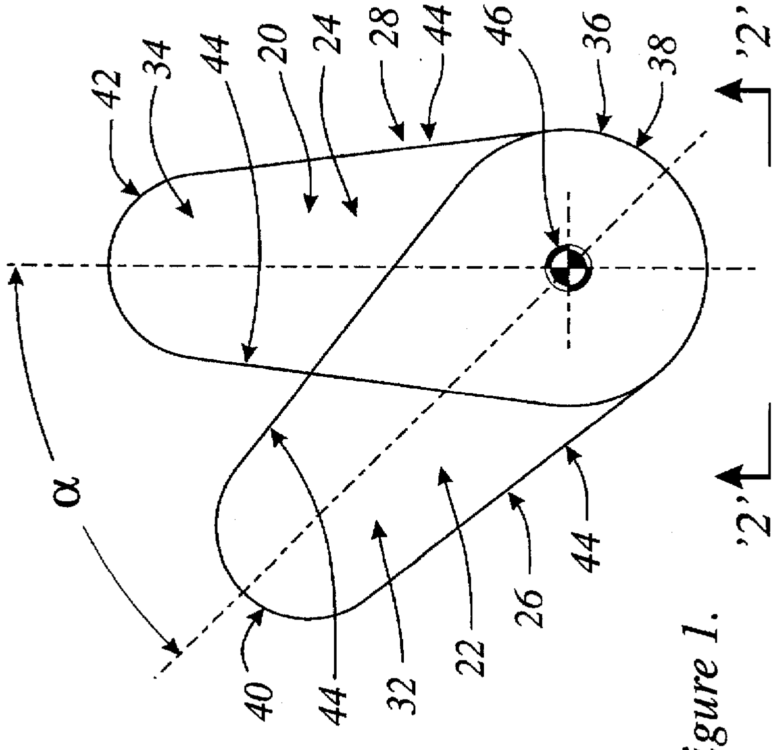
FIG. 1 is a top view of a rotationally phased part such as a cam of a design suitable for fabrication with the apparatus and method of the present invention.

An undercut part is shown generally in FIGS. 1 and 2 as 20. It has a first, or upper portion 22 and a second, or lower portion 24. Upper portion 22 has a first, or upper profile 26, and lower portion 24 has a lower profile 28. Upper portion 22 and lower portion 24 meet at an interface 30. An overhang 32 of upper portion 22 extends beyond the perimeter of lower portion 24 defined by lower profile 28. Similarly a toe 34 of lower portion 24 extends beyond the perimeter defined by upper profile 26. The lower face of overhang 32 lying along interface 30 defines an undercut 34.

In part 20 illustrated in FIGS. 1 and 2, upper profile 26 and lower profile 28 are identical, differing only in angular orientation. As shown they represent adjoining cams of a cam set, each having a major arc 36 and 38, respectively, and a minor arc, 40 and 42, respectively, joined by tangential surfaces 44. As shown, major arcs 36 and 38 share a common radius of curvature about an axis 46, which, for convenience shall arbitrarily be referred to as a longitudinal, or vertical axis. Overhang 32 corresponds to that portion of upper profile 26 that extends beyond lower profile 28 when upper profile 26 bas been displaced relative to lower profile 28 by rotation about, and in a plane perpendicular to, axis 46 through a phase angle α, as indicated in FIG. 2. In such a position upper portion 22 is rotationally phased relative to lower portion 24.

In a part 50 illustrated in FIG. 3, once again there is provided upper portion 22 and lower portion 24 having profiles 26 and 28 respectively, and overhang 54 and a toe 56. In this case profiles 26 and 28 share a common major axis 58 and have respective minor axes 60 and 62. Axes 58, 60, and 62 are perpendicular to axis 46. Axes 60, and 62 are offset laterally, that is to say, transversely to axis 46, from each other by linear translation through a translational phase displacement indicated as δ. In the position shown in FIG. 3, upper portion 22 is translationally phased relative to lower portion 24.

Figure 3:
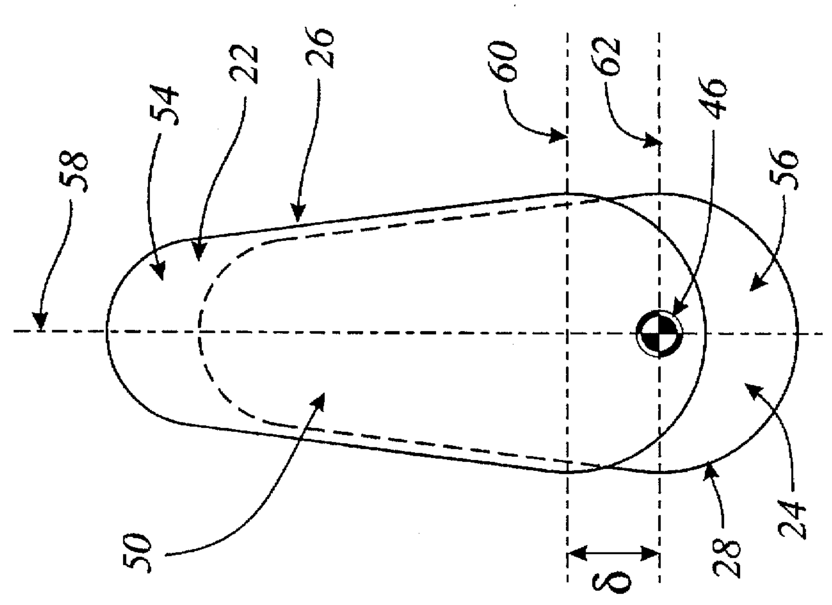
FIG. 3 is a top view similar to FIG. 1 of an alternative embodiment of a phased part.

Although a cam set, in the nature of part 20 or part 50, is illustrated in FIGS. 1, 2 and 3, the invention as described herein can be used to manufacture gear sets or any other part which is phased or has an undercut in the compacting direction, that is, the direction parallel to axis 46.

A tool set 70 for making phased parts, such as part 20 or part 50, is shown, in simplified form, in FIGS. **4*a* through 4*e*. An axis 68, which is arbitrarily denoted a longitudinal, or vertical axis, is defined to facilitate explanation. Tool set 70 includes an upper die set comprising an upper die 72 and a mating upper punch 74. The punch 74 can slide within die 72 so can move parallel to axis 68. Tool set 70 also includes a lower die set including a lower die 76 and its corresponding mating lower punch 78 which is slidably mounted for movement parallel to axis 68. Tool set 70 may be mounted in a press 80, as shown in FIG. 6, of a type well known to those skilled in the art, which includes a head having an upper ram 82, and a base having lower ram 84 and press table 86 which is fixed relative to the frame of press 80**.

As shown in FIG. 6, lower punch 78 is rigidly mounted to press table 86. Lower die 76 is mounted about lower punch 78 and is rigidly mounted to lower ram 84 on supports 88 such that motion of lower ram 84 relative to press table 86 parallel to axis 72 will result in corresponding relative motion of lower die 76 to lower punch 78. Upper punch 74 is rigidly mounted to upper ram 82 such that motion of upper ram 82 relative to press table 86 parallel to axis 72 will result in corresponding relative motion of upper punch 74 to lower punch 78. Upper die 72 is mounted to upper ram 82 through the medium of a drive system 90 which may comprise a pair of hydraulic cylinders 92 mounted to upper ram 82.

Phased rotation may be accomplished by a variety of means. As illustrated in FIG. 6, upper ram 82 is further provided with a cylindrical body 94 having gearing 96. Press 80 is provided with a worm gear 98 for engagement with gearing 96. Phased rotation of upper die 72 and upper punch 74 relative to lower die 76 and lower punch 78 is then achieved by activating worm gear 98 to engage gearing 96, thereby causing cylindrical body 94, and hence upper die 72 and upper punch 74, to rotate about axis 68.

Phased lateral movement may be accomplished by a variety of means such as using an hydraulic cylinder which could be activated to move upper punch 74 and upper die 72 laterally relative to lower die 76.

The method of operation of tool set 70 will now be described with the aid of FIGS. 4*a* through 4*e*. FIG. 4*a* shows tool set 70 in an open, filling position for receiving a charge of powder, indicated generally as 'A'. Lower die 76 is shown at its highest position relative to lower punch 78, and the space between them, that is to say, the space between lower die wall 98 and lower punch distal end face 100 defines a pocket, or lower chamber, 102 for receiving charge 'A'. In this open position upper die 72 and upper punch 74 are withdrawn to their highest position to permit a feed box (not shown) to move over lower chamber 102 and deposit charge 'A' therein. In a relative sense, lower punch 78 is moved far enough down within lower die 76 that lower chamber 102 can contain the entire amount of powder to form part 20 or 50, as the case may be.

After the filling of lower chamber 102 upper ram 82 is moved down until upper die 72 meets lower die 76 at an interface 104 defined by the contacting surfaces of upper die 72 and lower die 76, closing lower chamber 102. As shown in FIG. 4*b*, upper ram 82 continues to travel downward to move upper die 72 and upper punch 74. Simultaneously, lower ram 84 moves lower die 76 downward to transfer some of charge of powder 'A' from lower chamber 102 into an upper chamber 106 defined as the space between upper die 72 and upper punch 74, that is to say, within upper die wall 108 and below upper punch distal end face 110. When upper die 72 and lower die 76 are brought together to meet at interface 104 chambers 102 and 106 define between them a closed mold cavity 112. Examination of FIGS. 4*a* through 4*e* shows that the size of chambers 102 and 106, and hence cavity 112, is variable according to the relative positions of punches 74 and 78, and dies 72 and 76. More specifically, the combined size of chambers 102 and 106, and hence by definition cavity 112, in FIGS. 4*b* and 4*c* is equal to the filling size of lower chamber 102 in FIG. 4*a*. The downward relative motion of lower die 76 relative to lower punch 78 between the filling position of FIG. 4*a* and the transfer position of FIG. 4*b* results in upward motion of a portion of charge of powder 'A' relative to, and across, interface 104 to enter upper chamber 106.

The movement of powder metal into upper chamber 106, called transfer, occurs prior to phasing so that the powder metal does not have any obstruction to flow which may result in pre-densification. Although lower punch 74 is stationary in FIGS. 4*a* through 4*e*, it could also be moved to transfer the powder material into upper chamber 106.

Thereafter upper punch 74 and upper die 76 are phased relative to lower die 76 as illustrated in FIG. 4*c* to produce part 20 or 50 having undercut 34. In particular the phasing can occur by rotation of dies 72, and 76 relative to each other or by laterally displacing dies 72 and 74 relative to each other. Rotation is particularly advantageous to produce a phased part such as a cam set in the nature of part 20 as illustrated in FIGS. 1 and 2, upper die 72 being rotated relative lower die 76 by the same number of degrees to correspond to angle α as shown in FIG. 1.

In FIG. 4*c* the upper die and punch pair, that is upper die 72 and upper punch 74 have been phased relative to the lower die and punch pair, that is lower die 76 and lower punch 78. In other words there is lateral displacement transverse to axis 68 of one die and punch pair. The movement of the powder metal into the upper cavity, called transfer, occurs prior to phasing so that the powder metal does not have any obstruction to flow which may result in pre-densification. As also shown in FIGS. 4*b* and 4*c*, phasing occurs with chambers 102 and 106 in closed communication and with dies 72 and 76 in contact at interface 104.

Phased lateral movement may be accomplished by a variety of means such as utilizing an hydraulic cylinder which could be activated to move upper punch 74 and upper die 72 laterally relative to lower die 78, that is, transverse to, or in a plane normal to, vertical axis 68.

Figure 4D:
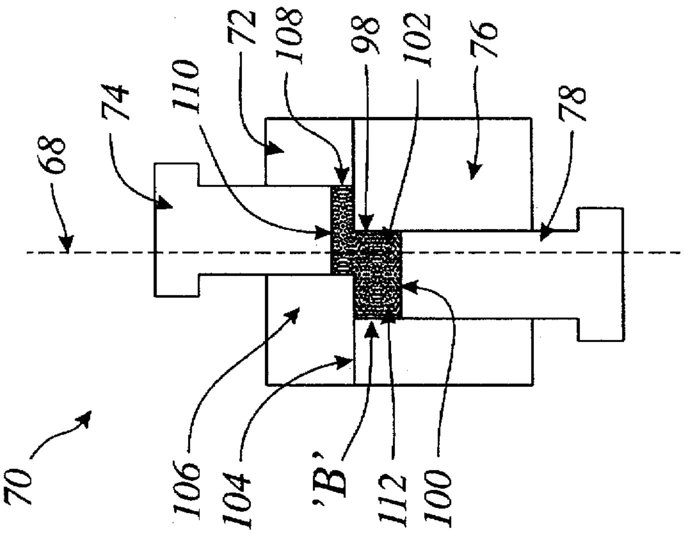
Figure 4C:
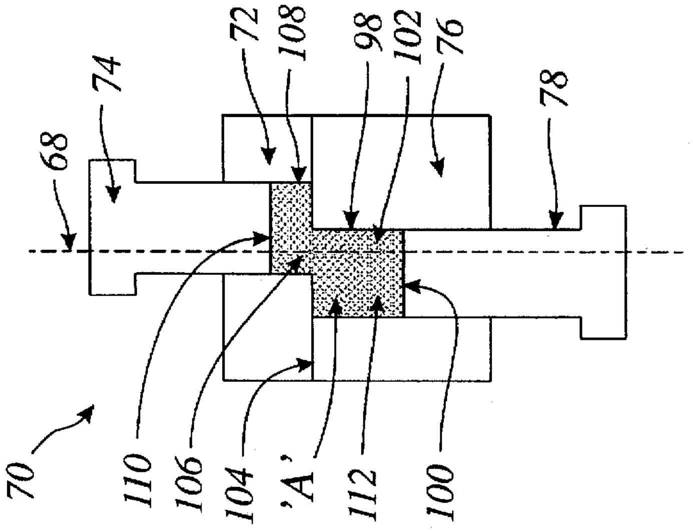

The compaction step is then shown in FIG. 4*d* and is accomplished by moving upper ram 82 and both dies 72 and 76 and upper punch 74 with a suitable speed relationship. After compaction the part indicated generally as 'B' is ejected by withdrawing upper die 72 upward and lower die 72 downward as shown in the ejection position FIG. 4*e* in which upper die 72 and lower die 76 have been separated at interface 104 and withdrawn, upper die 72 withdrawn flush with upper punch 74 and lower die 76 withdrawn flush with lower punch 78 to expose part 'B'. Compaction occurs after phasing.

As shown in FIGS. 4*a* to 4*e*, respectively, tool set 70, and hence a press assembly including press 80 of FIG. 6 and tool set 70, is movable to filling, transfer, transverse displacement, compaction and withdrawal positions. Upper die 72 is illustrated mounted in at least partial engagement of upper punch 74, and Lower die 76 is illustrated mounted in at least partial engagement of lower punch 78 throughout FIGS. 4*a* to 4*e*.

The embodiment illustrated in FIGS. 4*a* through 4*e* shows the compaction of a single level part 20 or 50 with an undercut 34. The invention is not limited thereto but can also be used for multi-level parts with an undercut by introducing necessary additional top and bottom punches. For example, FIG. 5 illustrates a tool set 120 for producing a part having multiple levels by utilizing several punches. Those illustrated in tool set 120 of FIG. 5 include a core rod 122; an inner lower, or hub punch 124, disposed about core rod 122; an intermediate lower, or lower web punch 126, disposed about hub punch 124; and an outer lower, lower flange, or lower crown punch 128, disposed about lower web punch 126 and contained within a lower die 130. Corresponding upper die and punch components are shown as an upper, upper web or upper inner punch 132 having an aperture 134 for admitting core rod 122; an upper outer, upper flange, or upper crown punch 136; and an upper die 138. Upper inner punch 132, upper crown punch 136 and upper die 138 are nested in a manner similar to that described for lower members of tool set 120. Numeral 140 shows the pitch diameter of the tooth form within the punches and respective dies. Rotationally phasing upper die 138 relative to lower die 130 according to the method of the present invention through a phase angle α will result in a part having upper and lower gear profiles having teeth offset by that angle.

In order to conduct all necessary movements during the cycle with suitable precision, speeds and timing, an hydraulic press with closed loop controls is preferably used, although the invention is not limited thereto.

The drawings illustrate the withdrawal principal which means that after compaction the lower die is withdrawn to eject the part. However the invention described herein is also applicable for the counterpressing principle in which case the bottom, or lower, die is stationary relative to the press and all the bottom, or lower, punches are mounted to the lower ram (including the drives for achieving relative movements between the bottom punches, if more than one bottom punch), so that after compaction the bottom punches will be moved further through the bottom die by the lower ram in order to eject the part.

Although the preferred embodiment and its operation and use have been specifically described in relation to the drawings, it should be understood that variations from the preferred embodiment could be achieved by a person skilled in the art without departing from the spirit of the invention as claimed herein.

We claim:

1. A toolset to compact a part out of powder material, comprising:

(a) an upper die moveable along an axis relative to a lower die;

(b) at least one upper punch associated with said upper die for relative movement within said upper die;

(c) at least one lower punch associated with said lower die for relative movement within said upper die;

(d) said lower punch and said lower die defining a lower chamber for receiving said powder material when said dies are in an open position;

(e) said upper die being:

(i) engageable with said lower die to define a closed position to place said chambers in communication and thereby define a mold cavity and moveable in said closed position with said lower die along said axis relative to said lower punch so as to transfer said powder material to an upper chamber formed between said upper die and said upper punch; and (ii) said upper punch moveable in said closed position relative to said lower die by a drive acting between said dies to a closed and displaced position;

(f) said upper and lower punches moveable toward each other with said dies in said closed and displaced position to compact said powder material so as to produce said part; and (g) said dies moveable to said open position for ejection of said compacted part.

2. A toolset as claimed in claim 1 wherein said drive moves said dies to said closed and displaced position by rotating said upper punch relative to said lower die.

3. A toolset as claimed in claim 1 where said drive moves said dies to said closed and displaced position by laterally displacing said pair of dies relative to one another.

4. A toolset as claimed in claim 1 wherein said lower punch is maintained stationary on said axis and said upper die and lower die are moved along said axis so as to transfer said powder material into said upper chamber.

5. A toolset as claimed in claim 1 wherein said upper die includes an opening for slidably receiving said upper punch for linear relative movement therebetween along said axis.

6. A toolset as claimed in claim 5 wherein said lower die includes an opening for slidably receiving said lower punch for linear relative movement therebetween.

7. A device to compact parts out of powder material in a press having an upper and lower arm comprising:

(a) an upper die linearly moveable relative to a lower die between an open position, a closed position and an eject position;

(b) first drive means to effect relative movement between said dies along an axis;

(c) at least one upper punch associated with said upper die to permit linear relative movement along said axis;

(d) second drive means to effect relative movement between said upper die and said upper punch;

(e) at least one lower punch associated with said lower die to permit relative movement along said axis;

(f) third drive means to effect relative movement between said lower punch and said lower die;

(g) said lower punch defining a lower chamber with said lower die to receive said powder material when said dies are in said open position;

(h) said upper die being moveable by said first drive means to contact said lower die in said closed position and moveable conjointly with said lower die relative to said lower punch so as to transfer said powder material into an upper chamber formed between said upper die and said upper punch;

(i) said upper die being displaceable in a plane normal to said axis relative to said lower die in said closed position to define a mold cavity for said component; and (j) said dies being moveable to an eject position to permit ejection of said part after compaction in said cavity by relative movement of said punches along said axis.

8. A device as claimed in claim 7 wherein powder material is transferred from said lower chamber to said upper chamber by movement of said upper die, lower die and upper punch relative said lower punch in said closed position.

9. A method of producing a compacted part out of powder material by utilizing a toolset having an upper die, a lower die, at least one upper punch associated with said upper die, and at least one lower punch associated with said lower die, said method comprising the sequential steps of:

(a) positioning said upper die in spaced relationship with said lower die in an open position in which;

(i) said upper punch defines an upper chamber with said upper die; and (ii) said lower punch is disposed at a position relative to said lower die to define a lower chamber for receiving said powder material when said dies are in said open position;

(b) charging said lower chamber with said powder material;

(c) moving said upper die relative to said lower dies to contact said lower die and seal said chambers;

(d) moving said upper die and lower die relative to said lower punch to transfer said powder material to said upper chamber;

(e) displacing said upper punch and upper die relative to said lower die by relative motion therebetween in a plane transverse to said axis to define a mold cavity for said part;

(f) compacting said powder material between said upper and lower punches in said dies in said closed position to produce said compacted part; and (g) moving said dies to an eject position so as to eject said compacted part.

10. A method as claimed in claim 9 wherein said lower die includes a plurality of lower punches, each of said lower punches including an end for contacting said powder material in said lower chamber; said method including the step of moving said punches relative to said lower die to position said ends at different levels and thereby define a plurality of planes at different levels.

11. A method as claimed in claim 10 wherein said upper die includes a plurality of upper punches, each having an end for contacting said powder material in said upper cavity, said method including the step of moving said punches relative to said lower die to position said ends at different levels and thereby define a plurality of planes at different levels.

12. A toolset for a powder molding machine, said toolset having a pair of die sets each having a die and a punch with said punch being moveable relative to its respective die, said punch and die cooperating to define a chamber in each respective die set, said die sets being movable relative to one another to a closed position to place said chambers in communication and thereby to define a mold cavity, said punches being movable relative to one another in a direction parallel to a common axis to reduce the volume of said mold cavity and to compress powder therein, a drive acting between said dies to move one die relative to the other when in said closed position in a plane normal to said common axis, and independently of movement along said common axis, to displace said chambers relative to one another, and said dies being separable in the direction of said common axis to permit a molded component to be removed.

13. The toolset of claim 12 wherein one of said punches is movable relative to its respective die in a filling position in which said chamber defined between said one punch and its respective die has sufficient volume to contain an entire charge of powder for a compacted powder part.

14. The toolset of claim 13 wherein said one punch is movable relative to its respective die from said filling position to a transfer position to transfer powder between said chambers.

15. The toolset of claim 13 wherein in said filling position said paid of dies are spaced from one another to permit a charge of powder to be deposited in said chamber defined between said one punch and its respective die.

16. The toolset of claim 12 wherein both said dies are movable in said closed position relative to said punches to a compaction position for compacting a charge of powder, said dies being movable relative to one another from said compaction position to a withdrawal position in which said dies are separated.

17. The toolset of claim 12 wherein each of said punches remains engaged with its respective die during relative movement of said die sets.

18. A toolset as claimed in claim 12 wherein said drive rotates said chambers relative to one another.

19. A toolset as claimed in claim 12 wherein said drive laterally displaces said chambers relative one another.

20. A toolset for mounting in a powder compacting press that has an axis of reciprocation, said toolset comprising:

a first die set including a first die and a first punch movable within said first die and positioned relative to said first die to form a first chamber for receiving a charge of powder;

a second die set including a second die and a second punch movable within said second die and positioned relative to said second die to form a second chamber;

said second die being movable parallel to said axis of reciprocation toward said first die to meet said first die at an interface to place said first and second chambers in communication to define a closed mold cavity for containing the charge of powder, said second die being movable relative to said first die with said first and second dies in contact at said interface to a transversely displaced position.

21. The tool set of claim 20 wherein said second die is linearly displaceable relative to said first die, transverse to said axis, while said dies are in contact at said interface.

22. The tool set of claim 20 wherein, with said dies in contact at said interface, said second die is rotatable relative to said first die about an axis parallel to said axis of reciprocation.

23. The tool set of claim 20 wherein said first punch is movable relative to said first die to a filling position in which said first chamber is of sufficient volume to receive a charge of powder for making an entire compacted part.

24. The tool set of claim 23 wherein said second die is moveable to a position to close said first chamber and define said closed mold cavity, and said first punch is movable relative to said first die from said filling position to a transfer position in which a portion of said powder is transferred across said interface.

25. The tool set of claim 20 wherein said punches of said die sets are relatively movable when said die sets are in said transversely displaced position to a compacted position to transform said charge of powder to a compacted powder part.

26. The tool set of claim 25 wherein said toolset is movable from said compacted position to a withdrawal position in which said respective dies are separated at said interface and moved to a position flush with said respective punches to expose said compacted powder part.

27. A method for making compacted powder parts with a tool set including a pair of die sets each having a die and a punch positioned relative to its die to define respective chambers, said method comprising the sequential steps of:

a) establishing the toolset in a position in which said chambers are in communication to form a closed mold cavity with a charge of powder captured therein;

b) displacing a first of said dies relative to a second of said dies while maintaining said chambers in closed communication;

c) compacting the powder to form a compacted powder part; and d) ejecting the compacted powder part from the toolset.

28. The method of claim 27 wherein said step of displacing includes linearly translating said second of said dies relative to said first of said dies.

29. The method of claim 28 wherein said step of linearly translating includes forming an undercut.

30. The method of claim 27 wherein said step of displacing includes rotating said second of said dies relative to said first of said dies.

31. The method of claim 30 wherein relative rotation of said dies forms an undercut in said mold cavity.

32. The method of claim 30 wherein said first and second of said dies each have profiles for forming the teeth of a gear set and said step of rotating offsets profiles of said first of said dies from profiles of said second of said dies.

33. The method of claim 32 wherein the first and second dies each have profiles for forming the teeth of a gear set and said step of rotating offsets profiles of said first of said dies from profiles of said second of said dies.

34. The method of claim 27 wherein said step (a) includes:

a(i) filling one of said chambers with said charge of powder; and a(ii) transferring a portion of said charge of powder between said chambers.

35. The method of claim 34 including maintaining the first die in at least partial engagement with the first punch, and the second die in partial engagement with the second punch throughout steps (a), (b), (c) and (d).

36. The method of claim 27 wherein said step (a) includes:

a(i) moving a first punch to a position relative to said first of said dies in which the first chamber has a volume to contain the entirety of a charge of powder sufficient to fill said mold cavity and produce a compacted powder part;

a(ii) moving said die and punch sets to abut at an interface, thereby capturing the charge of powder; and a(iii) transferring a portion of the charge of powder across the interface.

37. The method of claim 36 wherein said step a(iii) includes moving said first punch to reduce the volume of said one chamber and adjusting the position of the second punch relative to the second die.

38. The method of claim 36 wherein said step of displacing includes linearly translating said second die relative to said first die.

39. The method of claim 36 wherein the step of displacing includes rotating said second die relative to said first die about an axis parallel to said axis of reciprocation.

40. The method of claim 36 wherein said step of ejecting the compacted powder part includes separating the dies at the interface to expose the compacted powder part.

* * * * *